July 21, 1942.  R. M. DEANESLY  2,290,636
DISTILLATION PROCESS
Filed Dec. 24, 1940
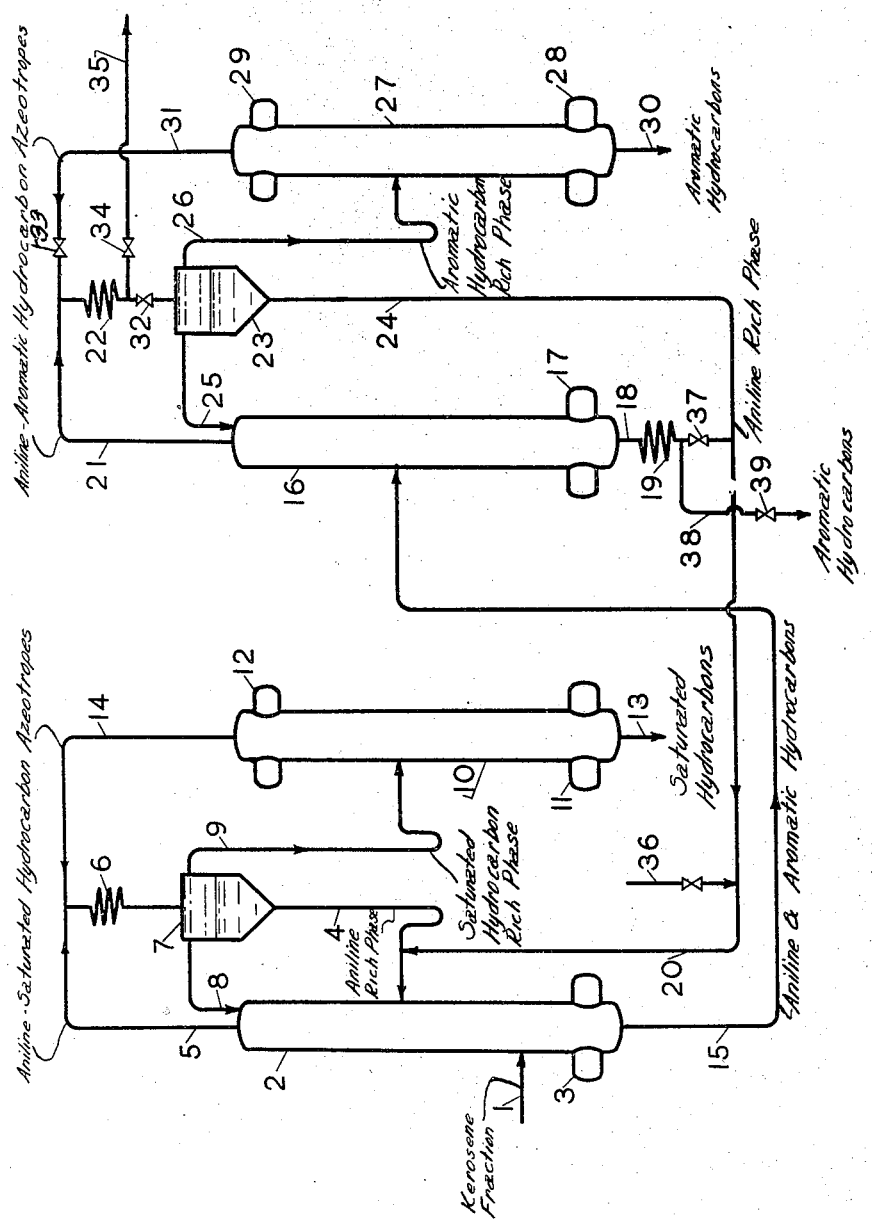
Inventor: Richard M. Deanesly
By his Attorney:

Patented July 21, 1942

2,290,636

UNITED STATES PATENT OFFICE 2,290,636

DISTILLATION PROCESS

Richard M. Deanesly, Berkeley, Calif., assignor to Shell Development Company, San Francisco, Calif., a corporation of Delaware Application December 24, 1940, Serial No. 371,481

8 Claims. (Cl. 202—42)

This invention relates to a method for the separation of a mixture of components by a combined distillation-extraction process and more particularly relates to a process wherein both azeotropic and extractive distillation processes are carried on simultaneously in the same fractionation zone.

It is well known in the art of distillation to separate mixtures of components which are difficult to separate by ordinary distillation, by employing auxiliary agents which form azeotropes with one or a group of the components to be separated. It is further well known that substances which are difficult to separate by ordinary distillation can sometimes be separated by the so-called vapor-phase extraction or the extractive distillation process in which a selective solvent for one or a group of components is passed down a fractionation column as vapors pass upward, selectively dissolving the more soluble components which are withdrawn from the lower portion of the column as a solution in the solvent, and are separated therefrom, while the remaining components pass overhead.

Each of these processes has its own sphere of usefulness, which is unfortunately often very limited chiefly due to the difficulties and limitations dictated by available solvents having the properties necessary for a given separation.

The properties which solvents or azeotropic agents must possess to be suitable are often very exacting: for example, when it becomes necessary to separate a component A from a component B, which have vapor pressures so similar as to make their separation difficult by ordinary distillation, it may be desired to separate them by azeotropic distillation. In such a case it is necessary to find a substance C which will form an azeotrope with only A or B but not with both, or else form azeotropes with A and B, which have considerably different boiling points. If no substance can be found answering these requirements, selective vapor-phase extraction or extractive distillation may be resorted to. But to carry out this process it is necessary to find a solvent which has a considerable selective solvent power for A in preference to B, or vice versa. In addition to this, it is required that the selective solvent shall not form azeotropic or pseudoazeotropic mixtures with the component preferentially dissolved. Needless to say, it is frequently difficult, if not impossible, to find a solvent having the required properties to effect a desired separation.

It is an object of my invention to provide a process wherein a good separation of substances otherwise difficultly separable by distillation can be obtained. It is another object to provide a process which permits a wider range of selection of azeotropic agents or extractive agents than has heretofore been possible in distillation processes; and it is a still further object to provide a process applicable to a wide variety of separations by distillation.

My invention comprises distilling narrow boiling mixtures of components to be separated in the presence of auxiliary agents which selectively dissolve some but not all of the components and at the same time form azeotropic mixtures with at least some of the remaining components.

My process may be better understood from the following description of the drawing representing a flow diagram, which illustrates a preferred arrangement of apparatus suitable for carrying out my process. Two methods of operation will be described wherein a two-component mixture is separated. In the first, an azeotrope-forming selective solvent is employed which forms azeotropes with both components, and in the second, a solvent which forms azeotropes with one component only is employed.

A straight run naphtha fraction having a relatively narrow boiling range, boiling, say, between 160° C. and 175° C., comprising paraffinic and aromatic hydrocarbons, is to be separated into two fractions of relatively pure paraffinic hydrocarbons and aromatic hydrocarbons, respectively. Aniline has been chosen for the solvent. Aniline forms azeotropes with both aromatic hydrocarbons and saturated hydrocarbons; however, the azeotropes formed with the saturated hydrocarbons boil at temperatures sufficiently below those of the azeotropes formed with aromatic hydrocarbons to enable their separation by azeotropic distillation with aniline. Aniline, moreover, is a selective solvent for aromatic hydrocarbons. It thus meets the criteria for solvent selectivity set forth in another portion of this specification.

The kerosene fraction is admitted either as a liquid or a vapor via line 1 to a primary fractionation column 2, equipped with reboiler 3. Aniline is admitted to column 2 via line 4. The amount of heat introduced through reboiler 3 is so regulated that an azeotropic vapor mixture is formed by the aniline and the saturated hydrocarbons, which mixture is taken off the top of column 2 via line 5 and is condensed and cooled in condenser-cooler 6. The resulting condensate passes to separator 7, wherein it separates into two layers, a lower layer consisting primarily of aniline and an upper layer consisting primarily of saturated hydrocarbons containing a relatively small amount of aniline.

The aniline is returned to column 2 for use in another cycle, via line 4. A part of the saturated hydrocarbon phase is returned to column 2 via line 8 to serve as reflux. Another part of the saturated hydrocarbon phase passes via line 9 to fractionation column 10 equipped with reboiler 11 and partial condenser 12. There is insufficient aniline in this feed to column 10 to form azeotropic mixtures with all of the saturated hydrocarbons in the feed. Therefore the excess of the latter can be withdrawn from the bottom of column 10 in relatively pure form via line 13 to storage not shown. The aniline saturated hydrocarbon azeotropes pass from column 10 through vapor line 14 to condenser-cooler 6. Reflux is supplied to column 10 by partial condenser 12.

Columns 2 and 10 are ordinarily operated under the same conditions of temperature and pressure, and the composition of the azeotropic mixture passing off column 10 is therefore similar to the composition of the azeotropic mixture passing off column 2, and the two azeotropic mixtures are treated in the same manner. However, if it is desired to operate columns 2 and 10 under different conditions of temperature and pressure, it may be desired to conduct the vapors from column 10 through separate cooling and separating systems not shown. While in this case the fundamental operation remains the same, a part of the hydrocarbon phase formed in the separation is returned to column 10 as reflux, thus obviating the necessity for partial condenser 12, and the aniline is returned to column 2 for use in another cycle.

Aniline is withdrawn from the lower portion of column 2 containing dissolved aromatic hydrocarbons which pass via line 15 to fractionation column 16 equipped with reboiler 17. In this column the dissolved aromatic hydrocarbons are stripped from the aniline. Valve 37 is opened and valve 39 is closed and the aniline passes off the bottom of column 16, via line 18 through cooler 19 and lines 20 and 4, back to column 2 for use in another cycle. Off the top of column 16 an azeotropic mixture, consisting substantially of aromatic hydrocarbons, passes via line 21 to condenser-cooler 22 and separator 23 wherein conditions are maintained to form two phases. It is frequently necessary to add a suitable demixing agent at this point to aid phase separation. The lower aniline-rich phase is returned to column 2 via lines 24, 20 and 4 for use in another cycle, and a part of the upper aromatic hydrocarbon-rich phase containing only minor portions of aniline is fed back to column 16 as reflux via line 25. Another part of the aromatic hydrocarbon-rich phase passes via line 26 to fractionation column 27, equipped with reboiler 28 and partial condenser 29. There is insufficient aniline in the feed to column 27 to form azeotropes with all of the aromatic hydrocarbons in the feed. These latter are withdrawn in a relatively pure form from the bottom of column 27 via line 30 to storage not shown. The azeotrope formed between the aniline and the aromatic hydrocarbons passes off column 27 via line 31, to condenser-cooler 22 and separator 23. Reflux is supplied to column 27 by partial condenser 29. Columns 16 and 27 are ordinarily operated under the same temperature and pressure conditions and the azeotropes formed in both columns have, therefore, similar compositions. Thus, the vapor mixture passing off column 27 may be treated in a similar manner to that of the vapor mixture off column 16. In this case also, when it is desired to operate columns 16 and 27 under different conditions of temperature and pressure, separate condensation and cooling systems not shown may be provided, with the elimination of partial condenser 29.

In the second mode of operation antimony trichloride has been chosen as the agent. This substance forms azeotropes only with saturated hydrocarbons and not with aromatic hydrocarbons, and the operation may be carried out as follows: Referring to the drawing: a suitable feed, for example, a straight run kerosene distillate boiling betwen 200° C. and 220° C., is admitted via line 1 to primary fractionation column 2 equipped with reboiler 3. The azeotropic-extractive agent, antimony trichloride, is admitted to column 2 via line 4. The heat applied to column 2 by means of reboiler 3 is so regulated that the antimony trichloride forms azeotropic mixtures with the saturated hydrocarbons of the feed, which pass off column 2 via line 5, thence to condenser-cooler 6 and separator 7 wherein two phases separate, a heavier antimony trichloride-rich phase which is returned to column 2 via line 4 for use in another cycle, and a lighter saturated hydrocarbon-rich phase containing only smaller amounts of antimony trichloride, a part of which phase is returned to column 2 via line 8 as reflux, and another part of which is fed via line 9 to fractionation column 10 equipped with reboiler 11 and partial condenser 12.

There is insufficient antimony trichloride present in the feed to column 10 to form azeotropic mixtures with all of the saturated hydrocarbons present in column 10. The excess saturated hydrocarbons are withdrawn from the bottom of column 10 via line 13 in a relatively pure condition, to storage not shown. Off the top of column 10, through line 14, passes an azeotropic mixture comprising saturated hydrocarbons and antimony trichloride, which is condensed and cooled in condenser-cooler 6. Reflux is supplied to column 10 by partial condenser 12. The composition of this azeotrope is similar to the composition of the azeotrope passing off column 2; thus, when columns 2 and 10 are operated under the same conditions of temperature and pressure, it may be treated similarly to the latter.

Antimony trichloride taken off the bottom of column 2 contains dissolved aromatic hydrocarbons and passes through line 15 to fractionation column 16 equipped with reboiler 17. In column 16 the aromatic hydrocarbons are stripped from the antimony trichloride and pass overhead via line 21 to condenser-cooler 22. Valves 32 and 33 are closed and valve 34 is open, thus providing an open line 35 for aromatic hydrocarbons to pass to storage not shown. Valve 37 is open and valve 39 is closed and from the bottom of column 16 the stripped antimony trichloride passes via line 18 and condenser-cooler 19 back through lines 20 and 4, to column 2 for use in another cycle.

Additional make-up quantities of azeotropic-extractive agent may be admitted to the system through line 36.

The above two descriptions have both illustrated cases where the component selectively dissolved and fed to column 16 from the bottom of column 2 boiled at a temperature below the boiling temperature of the solvent, and where the solvent was present in an amount in excess of that required to form azeotropes with all of the solvent. However, my process is not limited to this mode of operation. In cases where the solvent forms azeotropes with all of the components of the mixture to be separated, where the component selectively dissolved boils at a temperature above the boiling temperature of the solvent and where column 2 is operated in such a manner that the feed to column 16 contains a quantity of said component in excess of that required to form azeotropes with all of the solvent present, valve 37 is closed and valve 39 is opened and pure component is withdrawn via line 38, as well as from bottom of column 27 through line 30.

Under similar circumtances, with the exception that the solvent does not form azeotropes with the dissolved component in the feed to column 16, the dissolved component can be withdrawn from column 16 via line 38. In this case the solvent goes overhead and though it does not separate in separator 23, it returns to column 2 in the same manner as illustrated in the description.

For simplicity, the above drawing does not show pumps, heat exchangers, valves, vents, bypasses and other auxiliary equipment, the proper placement of which will be at once evident to those skilled in the art.

Feeds capable of being separated by my method should be made up of components which exhibit differences in solubilities in the solvent employed, and at the same time, one or both of the components should form low-boiling azeotropes with the solvent employed, provided that the component which is not preferentially dissolved forms the lower boiling azeotrope. Thus, it has been shown above that for the separation of aromatic from more saturated hydrocarbons aniline can be used in my process, since it is selective solvent for aromatics and forms azeotropic mixtures with both saturated and aromatic hydrocarbons. The aniline-saturated hydrocarbon azeotrope boils at a temperature sufficiently below the boiling temperature of the aniline-aromatic hydrocarbon azeotrope to enable the separation to be carried out with reasonable reflux ratios and reasonable plate requirements. In addition, suitable feeds should preferably boil at temperatures either substantially higher or substantially lower than the boiling point of the solvent, and must be chemically and thermally stable under the conditions of the distillation.

Suitable azeotrope-forming solvents have been defined above in terms of their necessary relationship to the components to be separated. Below are illustrative examples of feeds and solvents which may be useful in their separation.

For the separation of hydrocarbons of different degree of saturation the following solvents may be employed: the hydroxy aromatic compounds, such as the phenols, e. g., phenol, the cresols, xylenol, etc.; aromatic amino compounds such as aniline, methyl aniline, dimethyl aniline, etc.; aromatic nitro compounds such as nitrobenzene and nitrotoluene; the glycerol or glycol ethers and esters, such as ethyl carbitol, monomethyl glycerin, glycerol acetate, glycol acetate, etc.; other compounds with highly polar radicals, such as propionitrile, acetonitrile, nitromethane, nitroethane, acetone, methyl ethyl ketone, beta-beta' dichlorethyl ether, dioxane; the cyclic aldehydes such as furfural, benzaldehyde and the like; inorganic solvents such as water, anhydrous ammonia, liquid sulfur dioxide, antimony trichloride.

More specifically, ethylene may be separated from ethane, propylene may be separated from propane, and butylene may be separated from butane, by employing anhydrous ammonia, methyl amines, ethyl amines, etc.; alcohols, aliphatic acids, ethers and ketones may be dehydrated by employing such solvents as benzene, toluene, kerosene, etc.

For example, for the separation of dioxane and water, kerosene may be used; and for the separation of isopropyl alcohol and di-isopropyl ether or di-isobutylene and acetone, water may be used.

It is desirable that the solvent employed form azeotropes which upon cooling separate into two phases. Although not all solvents which otherwise would be suitable possess this property, this deficiency can frequently be overcome by employing some auxiliary substance which is soluble in the solvent but insoluble in the other component of the azeotropic mixture, as a demixing aid. For example, when employing phenol as a selective solvent for the separation of paraffinic from aromatic hydrocarbons, phase separation is improved by adding small amounts of a substance immiscible with hydrocarbons but miscible with phenol, such as ethylene glycol, glycerin, etc.

*Example*

A mixture of 6.3% isopropyl alcohol and 93.7% di-isopropyl ether was continuously fed to a distillation system similar to that illustrated in the figure. Water was used as the solvent. From the bottom of the column corresponding to column 1 was withdrawn a 6.8% solution of isopropyl alcohol and water. From the top of this column vapors of an azeotropic mixture comprising 94.5% di-isopropyl ether and 4.5% water were withdrawn. The vapors were condensed and separated in a separator. The lower water-rich phase was returned to column 1 while the upper phase, consisting predominantly of di-isopropyl ether, was fed to a column corresponding to column 10. From the bottom of the latter column pure di-isopropyl ether was withdrawn.

The aqueous solution of isopropyl alcohol was fed to a column corresponding to column 16. Water was withdrawn from the bottom of this column, cooled and returned to column 1 for use in another cycle, while an azeotropic mixture of isopropyl alcohol and water passed overhead and was condensed and separated with the aid of benzene, to give a lower water-rich layer, which was returned to column 1, and an upper alcohol-rich layer containing benzene, which was fed to a column corresponding to column 27. From the bottom of column 27 pure isopropyl alcohol was withdrawn.

I claim as my invention:

1. In a process for distilling a distillable homogeneous mixture comprising two or more components in the presence of a solvent, which is selective for some of said components, forms azeotropes with said components and is inert under the conditions of the process, one of the last of said azeotropes being adapted to form two phases upon cooling, the improvement comprising distilling said mixture in a first distillation zone in the presence of an amount of said solvent in excess of that required to form said azeotropes under conditions to produce an azeotropic vapor mixture and a residue both containing substantial portions of said solvent, separately withdrawing said vapor and said residue from said first distillation zone, condensing said withdrawn vapor, causing the condensate to separate into two phases, a phase rich in solvent and a phase rich in azeotrope-forming component, separating said phases, returning said phase rich in solvent to said first distillation zone, distilling at least a part of said phase rich in azeotrope-forming component in a second distillation zone to produce substantially pure azeotrope-forming component which is withdrawn and a second azeotropic vapor mixture, distilling at least a part of said residue from said first distillation zone in a third distillation zone under conditions to form a third azeotropic vapor mixture to produce two portions, one rich in solvent and one poor in solvent and returning part at least of said portion rich in solvent to said first distillation zone.

2. In a process for distilling a distillable homogeneous mixture comprising two or more components in the presence of a solvent which is selective for some of said components, forms azeotropes with said components and is inert under the conditions of the process, said azeotropes being adapted to form two phases upon cooling, the improvement comprising distilling said mixture in a first distillation zone in the presence of an amount of said solvent in excess of that required to form said azeotropes under conditions to produce an azeotropic vapor mixture and a residue both containing substantial portions of said solvent, separately withdrawing said vapor and said residue from said first distillation zone, condensing said withdrawn vapor, causing the condensate to separate into two phases, a phase rich in solvent and a phase rich in azeotrope-forming component, separating said phases, returning said phase rich in solvent to said first distillation zone, distilling at least a part of said phase rich in azeotrope-forming component in a second distillation zone to produce substantially pure azeotrope-forming component which is withdrawn, and a second azeotropic vapor mixture, distilling at least a part of said residue from said first distillation zone in a third distillation zone under conditions to form a third azeotropic vapor mixture to produce two portions, one rich in solvent and one poor in solvent and returning part at least of said portion rich in solvent to said first distillation zone.

3. In a process for distilling a distillable homogeneous mixture comprising two or more components in the presence of a solvent, which is selective for some of said components, forms azeotropes with said components and is inert under the conditions of the process, said azeotropes being adapted to form two phases upon cooling, the improvement comprising distilling said mixture in a first distillation zone in the presence of an amount of said solvent in excess of that required to form said azeotropes under conditions to produce an azeotropic vapor mixture and residue, both containing substantial portions of said solvent, separately withdrawing said vapor and said residue from said first distillation zone, condensing said withdrawn vapor, causing the condensate to separate into two phases, a phase rich in solvent and a phase rich in azeotrope-forming component, separating said phases, returning said phase rich in solvent to said first distillation zone, distilling at least a part of said phase rich in azeotrope-forming component in a second distillation zone to produce substantially pure azeotrope-forming component which is withdrawn, and a second azeotropic vapor mixture, combining the latter with the azeotropic mixture from said first distillation zone, distilling at least a part of said residue from said first distillation zone in a third distillation zone under conditions to form a third azeotropic vapor mixture to produce two portions, one rich in solvent and one poor in solvent and returning part at least of said portion rich in solvent to said first distillation zone.

4. In a process for distilling a distillable homogeneous mixture comprising two or more components in the presence of a solvent which is selective for some of said components, forms azeotropes with said components and is inert under the conditions of the process, said azeotropes being adapted to form two phases upon cooling, the improvement comprising distilling said mixture in a first distillation zone in the presence of an amount of said solvent in excess of that required to form said azeotropes, under conditions to produce a first azeotropic vapor mixture and a first residue, both containing substantial portions of said solvent, separately withdrawing said vapor and said residue from said first distillation zone, condensing said withdrawn vapor, causing the condensate to separate into two phases, a phase rich in solvent and a phase rich in azeotrope-forming component, separating said phases, returning said phase rich in solvent to said first distillation zone, distilling at least a part of said phase rich in azeotrope-forming component in a second distillation zone to produce substantially pure azeotrope-forming component which is withdrawn and a second azeotropic vapor mixture which is withdrawn, distilling at least a part of said residue from said first distillation zone in a third distillation zone under conditions to form a third azeotropic vapor mixture and a second residue, withdrawing said second residue, condensing said third azeotropic vapor mixture to produce a second condensate, causing said second condensate to separate into two phases, a second phase rich in solvent and a second phase rich in azeotrope-forming component, separating said second phases, returning said second phase rich in solvent to said first distillation zone, distilling said second phase rich in azeotrope-forming component in a fourth distillation zone to produce substantially pure azeotrope-forming component which is withdrawn, and a fourth azeotropic vapor mixture.

5. In a process for separating a distillable homogeneous mixture comprising components A and B, A boiling at a temperature above the boiling temperature of a solvent, A and B forming azeotropes with said solvent, said azeotrope formed with B boiling at a temperature below the boiling temperature of said azeotrope formed with A, said azeotropes being adapted to form two phases upon cooling, said solvent having greater solvent power for A than for B and being substantially chemically and thermally stable under the conditions of the process, the steps comprising distilling said mixture in a first distillation zone in the presence of a quantity of said solvent substantially in excess of that required to form azeotropes with all of B, withdrawing from the bottom of said zone said excess of solvent containing dissolved component A, said dissolved component A being present in an amount in excess of that amount which can form azeotropes with all of said excess solvent, withdrawing from the top of said zone a first azeotropic vapor comprising solvent and said component B, cooling said vapor to effect its condensation and separation into two phases, one being rich in component B and the other rich in solvent, returning said solvent-rich phase to said first distillation zone, distilling at least a part of said B phase in a second distillation zone, withdrawing from the upper portion of said second zone a second azeotropic vapor, withdrawing from the lower portion of said second distillation zone a fraction comprising predominantly B, distilling at least a part of said withdrawn solvent containing component A in a third distillation zone, withdrawing from the lower portion thereof substantially pure component A, withdrawing from the upper portion of said third distillation zone a third azeotropic vapor comprising solvent and component A, condensing said third azeotropic vapor to form two phases, a phase rich in component A and a phase rich in solvent, returning said last mentioned phase to said first distillation zone, distilling at least a part of said phase rich in A in a fourth distillation zone to produce substantially pure component A and a fourth azeotropic vapor.

6. The process of claim 5, wherein the second azeotropic vapor is combined with the first, and the fourth with the third.

7. In a process for distilling a distillable homogeneous mixture comprising two or more components in the presence of a solvent which is selective for some of said components, forms azeotropes with said components and is inert under the conditions of the process, said azeotropes being adapted to form two phases upon cooling, the improvement comprising distilling said mixture in a first distillation zone in the presence of an amount of said solvent in excess of that required to form said azeotropes, under conditions to produce a first azeotropic vapor mixture and a first residue, both containing substantial portions of said solvent, separately withdrawing said vapor and said residue from said first distillation zone, condensing said withdrawn vapor, causing the condensate to separate into two phases, a phase rich in solvent and a phase rich in azeotrope-forming component, separating said phases, returning said phase rich in solvent to said first distillation zone, distilling at least a part of said phase rich in azeotrope-forming component in a second distillation zone to produce substantially pure azeotrope-forming component which is withdrawn and a second azeotropic vapor mixture which is withdrawn, distilling at least a part of said residue from said first distillation zone in a third distillation zone under conditions to form a third azeotropic vapor mixture and a second residue rich in solvent and returning part at least of said second residue to said first distilation zone.

8. In a process for distilling a distillable homogeneous mixture comprising two or more components in the presence of a solvent which is selective for some of said components, forms azeotropes with said components and is inert under the conditions of the process, said azeotropes being adapted to form two phases upon cooling, the improvement comprising distilling said mixture in a first distillation zone in the presence of an amount of said solvent in excess of that required to form said azeotropes, under conditions to produce a first azeotropic vapor mixture and a first residue, both containing substantial portions of said solvent, separately withdrawing said vapor and said residue from said first distillation zone, condensing said withdrawn vapor, causing the condensate to separate into two phases, a phase rich in solvent and a phase rich in azeotrope-forming component, separating said phases, returning said phase rich in solvent to said first distillation zone, distilling at least a part of said phase rich in azeotrope-forming component in a second distillation zone to produce substantially pure azeotrope-forming component which is withdrawn and a second azeotropic vapor mixture which is withdrawn, distilling at least a part of said residue from said first distillation zone in a third distillation zone under conditions to form a third azeotropic vapor mixture and a second residue poor in solvent and returning part at least of said third azeotropic vapor mixture to said first distillation zone.

RICHARD M. DEANESLY.